(12) United States Patent
Makuni et al.

(10) Patent No.: US 11,681,612 B2
(45) Date of Patent: Jun. 20, 2023

(54) STORAGE APPARATUS AND METHOD THAT GENERATES PRELIMINARY MANAGEMENT INFORMATION INCLUDING THE SAME CONTENT AS MAIN MANAGEMENT INFORMATION FOR IDENTIFYING PHYSICAL ADDRESS OF DATA

(71) Applicant: BUFFALO INC., Nagoya (JP)

(72) Inventors: Kazuki Makuni, Nagoya (JP); Shuichiro Azuma, Nagoya (JP)

(73) Assignee: BUFFALO INC., Nagoya (JP)

( * ) Notice: Subject to any disclaimer, the term of this patent is extended or adjusted under 35 U.S.C. 154(b) by 67 days.

(21) Appl. No.: 17/322,902

(22) Filed: May 18, 2021

(65) Prior Publication Data
US 2021/0374051 A1 Dec. 2, 2021

(30) Foreign Application Priority Data
May 27, 2020 (JP) .............................. JP2020-092573

(51) Int. Cl.
*G06F 12/02* (2006.01)
*G06F 12/0831* (2016.01)
*G06F 13/16* (2006.01)
*G06F 12/0882* (2016.01)

(52) U.S. Cl.
CPC ...... *G06F 12/0246* (2013.01); *G06F 12/0833* (2013.01); *G06F 12/0882* (2013.01); *G06F 13/1668* (2013.01); *G06F 2212/214* (2013.01); *G06F 2212/7201* (2013.01)

(58) Field of Classification Search
CPC ............. G06F 12/0246; G06F 12/0833; G06F 12/0882; G06F 13/1668; G06F 2212/214; G06F 2212/7201; G06F 2212/1032; G06F 2212/7204; G06F 2212/7207; G06F 3/0614; G06F 3/0629; G06F 3/0682
See application file for complete search history.

(56) References Cited

U.S. PATENT DOCUMENTS

| 2012/0159046 A1 | 6/2012 | Norimatsu et al. |
| 2012/0159244 A1* | 6/2012 | Hirao .................. G06F 11/1441 714/E11.119 |
| 2013/0282945 A1* | 10/2013 | Kelly .................... G06F 9/4401 710/305 |

(Continued)

FOREIGN PATENT DOCUMENTS

| JP | 2005-293119 A | 10/2005 |
| JP | 2010-146087 A | 7/2010 |

(Continued)

*Primary Examiner* — Tasnima Matin
(74) *Attorney, Agent, or Firm* — Xsensus LLP

(57) ABSTRACT

A storage apparatus includes: a memory that stores data and main management information, the main management information identifying a physical address of the data; and processing circuitry configured to generate preliminary management information that includes information of the same content as the main management information, and select, as use management information, any one of the main management information and the preliminary management information upon start of the storage apparatus. Access to the data stored in the memory is performed using the selected use management information.

17 Claims, 4 Drawing Sheets

(56) References Cited

U.S. PATENT DOCUMENTS

| | | | | |
|---|---|---|---|---|
| 2014/0149640 A1* | 5/2014 | Burke | ............... | G06F 1/32 |
| | | | | 711/103 |
| 2014/0281150 A1* | 9/2014 | Kuo | ............... | G06F 12/0246 |
| | | | | 711/103 |
| 2017/0199672 A1* | 7/2017 | Ryu | ............... | G06F 9/4408 |
| 2019/0004964 A1* | 1/2019 | Kanno | ............... | G06F 3/0619 |

FOREIGN PATENT DOCUMENTS

| JP | 2012-128643 A | 7/2012 |
|---|---|---|
| JP | 2012-128645 A | 7/2012 |

\* cited by examiner

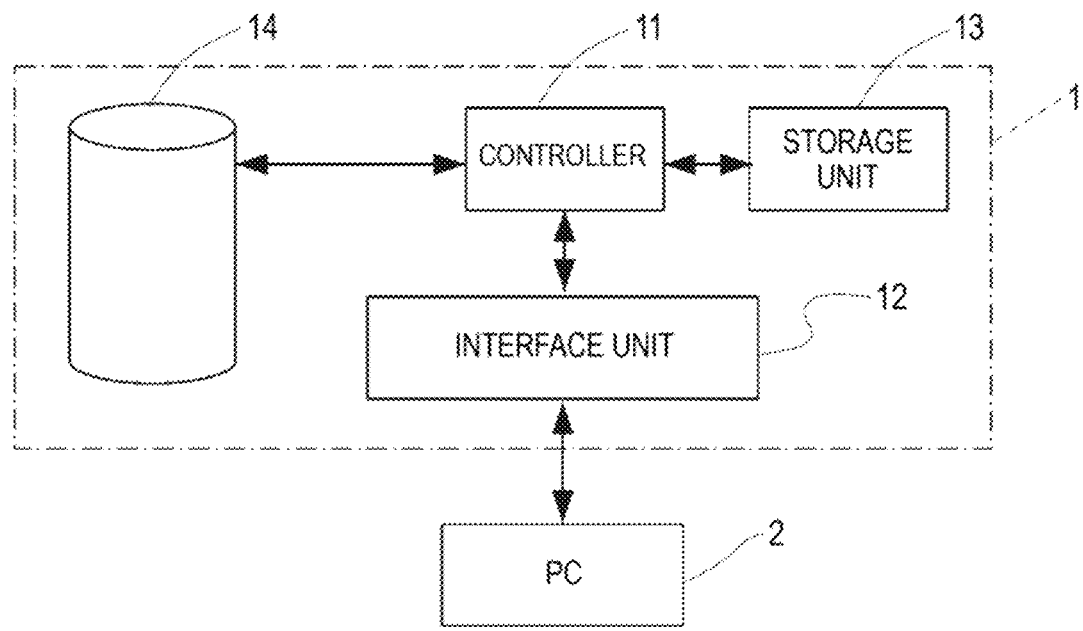

STORAGE APPARATUS AND METHOD THAT GENERATES PRELIMINARY MANAGEMENT INFORMATION INCLUDING THE SAME CONTENT AS MAIN MANAGEMENT INFORMATION FOR IDENTIFYING PHYSICAL ADDRESS OF DATA

CROSS-REFERENCE TO RELATED APPLICATION

This application is based on and claims priority under 35 USC 119 from Japanese Patent Application No. 2020-092573 filed on May 27, 2020, the contents of which are incorporated herein by reference.

TECHNICAL FIELD

The present disclosure relates to a storage apparatus configured to store data.

BACKGROUND

JP-A-2005-293119 discloses a disk array control apparatus configured to control access to a logical disk capable of distributing and storing redundant data corresponding to data into a plurality of physical disks.

In the disk array control apparatus, when a bad sector having unrestorable data unavailability is detected upon read access to the logical disk, an alternative sector to replace the bad sector is prepared. Loss information indicative of data unavailability is recorded in a loss information area of the alternative sector.

SUMMARY

The present disclosure provides a storage apparatus that includes: a memory that stores data and main management information, the main management information identifying a physical address of the data; and processing circuitry configured to generate preliminary management information that includes information of the same content as the main management information, and select, as use management information, any one of the main management information and the preliminary management information upon start of the storage apparatus. Access to the data stored in the memory is performed using the selected use management information.

BRIEF DESCRIPTION OF DRAWINGS

FIG. 1 is a block diagram depicting a configuration example of a storage apparatus in accordance with an embodiment of the present disclosure;

FIG. 2 illustrates an example of management information that is held in the storage apparatus in accordance with the embodiment of the present disclosure;

DETAILED DESCRIPTION

Figure 3:
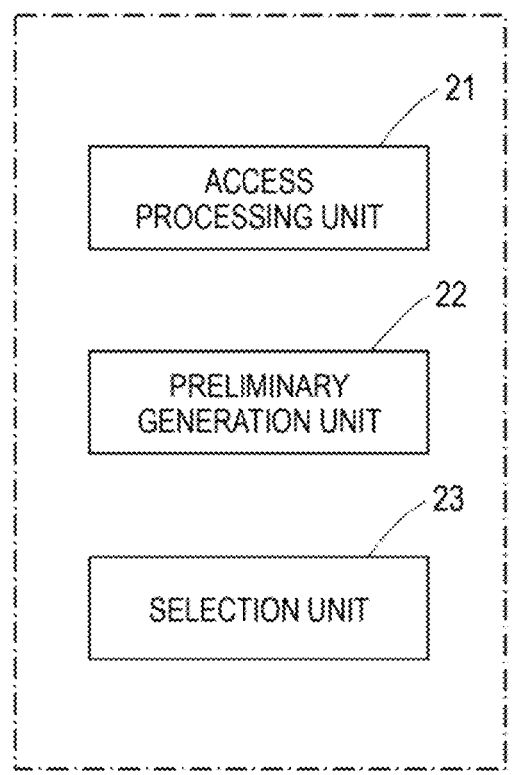
FIG. 3 is a functional block diagram depicting an example of the storage apparatus in accordance with the embodiment of the present disclosure.

In a storage apparatus such as an SSD (Solid State Drive), when management information, which includes a conversion table from a logical address to a physical address, is corrupted, stored data cannot be accessed.

The present disclosure has been made in view of the above situations, and an object thereof is to provide a storage apparatus capable of enabling data to be read out even when management information is corrupted.

An embodiment of the present disclosure will be described with reference to the drawings. As shown in FIG. 1, a storage apparatus 1 of the embodiment of the present disclosure is connected to a host 2, and includes a controller 11, an interface unit 12, a storage unit 13, and a flash memory unit 14. As used herein, the host 2 is a general personal computer (PC) or the like.

The controller 11 is a program control device such as a CPU, and is configured to operate according to firmware stored in the flash memory unit 14. The controller 11 is configured to read out the firmware from the flash memory unit 14 upon start, and to operate according to the read firmware. The controller 11 corresponds to the processing circuitry of the present disclosure.

In an example of the present embodiment, the storage apparatus 1 is an SSD where a storage area is divided into a plurality of blocks and each block is further divided into pages and managed. A physical block identifier is allotted to each block, and an inherent physical page address is allotted to each page in each block. That is, in the present embodiment, a place where data is stored is specified by the physical block identifier and the physical page address. That is, in the present embodiment, the physical block identifier and the physical page address correspond to a physical address.

The host 2 is configured to specify each storage area of the storage apparatus 1 by a logical address (LBA). As shown in FIG. 2, the storage apparatus 1 has a conversion table (logical/physical table) for specifying a corresponding physical address with respect to a logical address that is managed by the host 2. When an instruction to read or write data, which designates a logical address, is received from the host 2, the storage apparatus 1 converts the designated logical address to a corresponding physical address. Then, the storage apparatus 1 reads out data from a storage area specified by the converted physical address or writes data to the storage area. Since the operations of the storage apparatus 1 are well-known, the detailed descriptions thereof are here omitted.

One of features of the present embodiment is that the storage apparatus 1 holds main management information and preliminary management information, as management information including a conversion table from a logical address to a physical address. As used herein, the preliminary management information includes information of the same content as the main management information and will be described in detail later.

In an example of the present embodiment, the controller 11 is configured to select any one of the main management information and the preliminary management information, as use management information, upon start. The controller 11 is configured to access data stored in the flash memory unit 14 by using the selected use management information. The controller 11 is configured to generate the preliminary management information including information of the same content as the main management information while selecting at least the main management information as the use management information and accessing data stored in the flash memory unit 14. The detailed operations of the controller 11 will be described later.

The interface unit 12 is an external interface having a plurality of signal lines (signal pins), such as a SATA (Serial AT Attachment) interface, and is connected to the host 2. The storage apparatus 1 is configured to receive an instruction to read or write data from the host 2 via the interface unit 12. The storage apparatus 1 is also configured to output the read data and the like to the host 2 via the interface unit 12.

The storage unit 13 is one of devices for storage provided to the storage apparatus 1 of the present embodiment, and includes a DRAM (Dynamic RAM), for example. The storage unit 13 is configured to operate as a work memory of the controller 11 and to operate as a cache memory of the flash memory unit 14. The storage unit 13 may also include an SRAM (Static RAM). The storage unit 13 may also include a NOR flash memory, a serial NAND, an MRAM and the like, as a non-volatile storage element and a non-volatile memory device. The storage unit 13 corresponds to the second memory of the present disclosure.

The flash memory unit 14 is another device for storage provided to the storage apparatus 1 of the present embodiment, and corresponds to the memory of the present disclosure. In an example of the present embodiment, the flash memory unit 14 is a NAND flash memory device. As described above, the flash memory unit 14 is configured to identify a storage area, which is a storage destination of data, by a physical address.

In the flash memory unit 14, a program such as firmware that is executed by the controller 11 upon start, is also stored. Here, the program is stored in a computer-readable non-transitory recording medium and may be one copied to the flash memory unit 14. The flash memory unit 14 is also configured to identify and manage the storage area into a main management information storage area in which the main management information is stored and a user area in which user data is stored.

Note that, the firmware may also be stored in a non-volatile storage element or a non-volatile memory device of the storage unit 13. In this case, when the storage apparatus 1 cannot start using the firmware stored in the flash memory unit 14 (when the storage area of the firmware in flash memory unit 14 is damaged, for example), the storage apparatus 1 starts using the firmware stored in the storage unit 13 (or the ROM).

Subsequently, operations of the controller 11 are described. The controller 11 in accordance with an example of the present embodiment executes the firmware, thereby implementing a configuring functionally including an access processing unit 21, a preliminary generation unit 22, and a selection unit 23, as shown in FIG. 3.

Here, the access processing unit 21 is configured to receive an instruction to read or write data from the host 2 via the interface unit 12. The access processing unit 21 is configured to access the flash memory unit 14, in response to the received instruction. Specifically, the access processing unit 21 is configured to receive an instruction to read out data from the host 2. The instruction includes a designation of a logical address indicative of a position at which data to be read out is stored.

The access processing unit 21 is configured to acquire a physical address corresponding to the designated logical address by referring to the use management information selected by the selection unit 23. The access processing unit 21 is configured to read out data from a storage destination indicated by the acquired physical address, and to transmit the read data to the host 2.

When a designation of a logical address indicative of a writing destination and an instruction to write data are received from the host 2, the access processing unit 21 acquires a physical address corresponding to the designated logical address by referring to the use management information selected by the selection unit 24.

The access processing unit 21 is configured to check whether data is already stored in a block specified by the acquired physical address, and reads data in the block (hereinbelow, referred to as 'target block') into the cache when it is checked that data is stored. The access processing unit 21 is configured to specify a physical address (referred to as a new address) of an empty block in which data is not stored at that time. The access processing unit 21 is configured to overwrite a part, which is specified by the acquired physical address, of the cached data with instructed data, and to write the data whose at least a part is overwritten into the empty block. The access processing unit 21 sets data in the target block (the block specified by the acquired physical address) as being invalid (sets the target block as an empty block). The access processing unit 21 is also configured to rewrite the physical address, which corresponds to the logical address received from the host 2, of the use management information to the new address. Since the operations are well-known as Read-Modify-Write processing (RMW processing) or the like, the detailed descriptions thereof are omitted.

On the other hand, when the block specified by the acquired physical address is an empty block, the access processing unit 21 stores the instructed data in the empty block by referring to the use management information.

When the main management information is rewritten by the RMW processing or the like, the preliminary generation unit 22 copies the rewritten main management information to generate preliminary management information. Alternatively, the preliminary generation unit 22 may also be configured to perform the same rewriting as the rewriting performed on the main management information on the preliminary management information, thereby updating the preliminary management information.

The preliminary generation unit 22 may also be configured to store the generated or updated preliminary management information into the flash memory unit 14, like the main management information. In a case where the storage unit 13 has a non-volatile storage element or a non-volatile memory device, the preliminary generation unit 22 may store the generated or updated preliminary management information into the non-volatile storage element or the non-volatile memory device of the storage unit 13, separately from the main management information.

In the present embodiment, the timing at which the preliminary generation unit 22 generates or updates the preliminary management information is not limited to the timing at which the main management information is updated. For example, the preliminary management information may be generated or updated each time a predetermined time elapses or each time the main management information is updated by a predetermined number of times.

In an example of the present embodiment, when the RMW processing is executed to rewrite the preliminary management information while the preliminary management information is sets as the use management information (while starting in an emergency mode), the storage apparatus 1 copies the rewritten preliminary management information to generate the main management information. Alternatively, the storage apparatus 1 may update the main management information by performing the same rewriting as the rewriting performed on the preliminary management information on the main management information.

However, while the preliminary management information is set as the use management information (while starting in an emergency mode), the access processing unit 21 may not receive an instruction to write all data (may prohibit writing). In this case, since the preliminary management information and the main management information are not updated, this processing is not required. Here, the instruction to write data is based on a command from the host 2, and also includes an instruction that is made when performing rewriting in background processing (garbage collection processing and the like) in the storage apparatus 1. In an example of the present embodiment, in this way, the writing or rewriting of all data is not performed while starting in the emergency mode.

The selection unit 23 is configured to determine whether to start the storage apparatus 1 in a mode (usual mode) where access to the flash memory unit 14 is performed using the main management information or in a mode (emergency mode) where access to the flash memory unit 14 is performed using the preliminary management information, based on a predetermined determination reference, upon start of the storage apparatus 1.

Here, the predetermined determination reference may be a reference as to whether a circuit is wired as predetermined, for example. Specifically, the predetermined determination reference may be a reference as to whether a predetermined signal line (for example, a GPIO (General Purpose I/O)) of the interface unit 12 is electrically high (High) (whether the GPIO is connected to a line that is electrically high). As an example, upon start of the storage apparatus 1, the selection unit 23 checks whether the GPIO of the interface unit 12 is electrically high. When it is checked that the GPIO of the interface unit 12 is electrically high, the selection unit 23 determines to start the storage apparatus 1 in the mode (usual mode) where access to the flash memory unit 14 is performed using the main management information, and sets the main management information as the use management information. In this example, when it is checked that the GPIO of the interface unit 12 is not electrically high upon start of the storage apparatus 1, the selection unit 23 determines to start the storage apparatus 1 in the mode (emergency mode) where access to the flash memory unit 14 is performed using the preliminary management information, and sets the preliminary management information, as the use management information.

[Operations]

Figure 4:
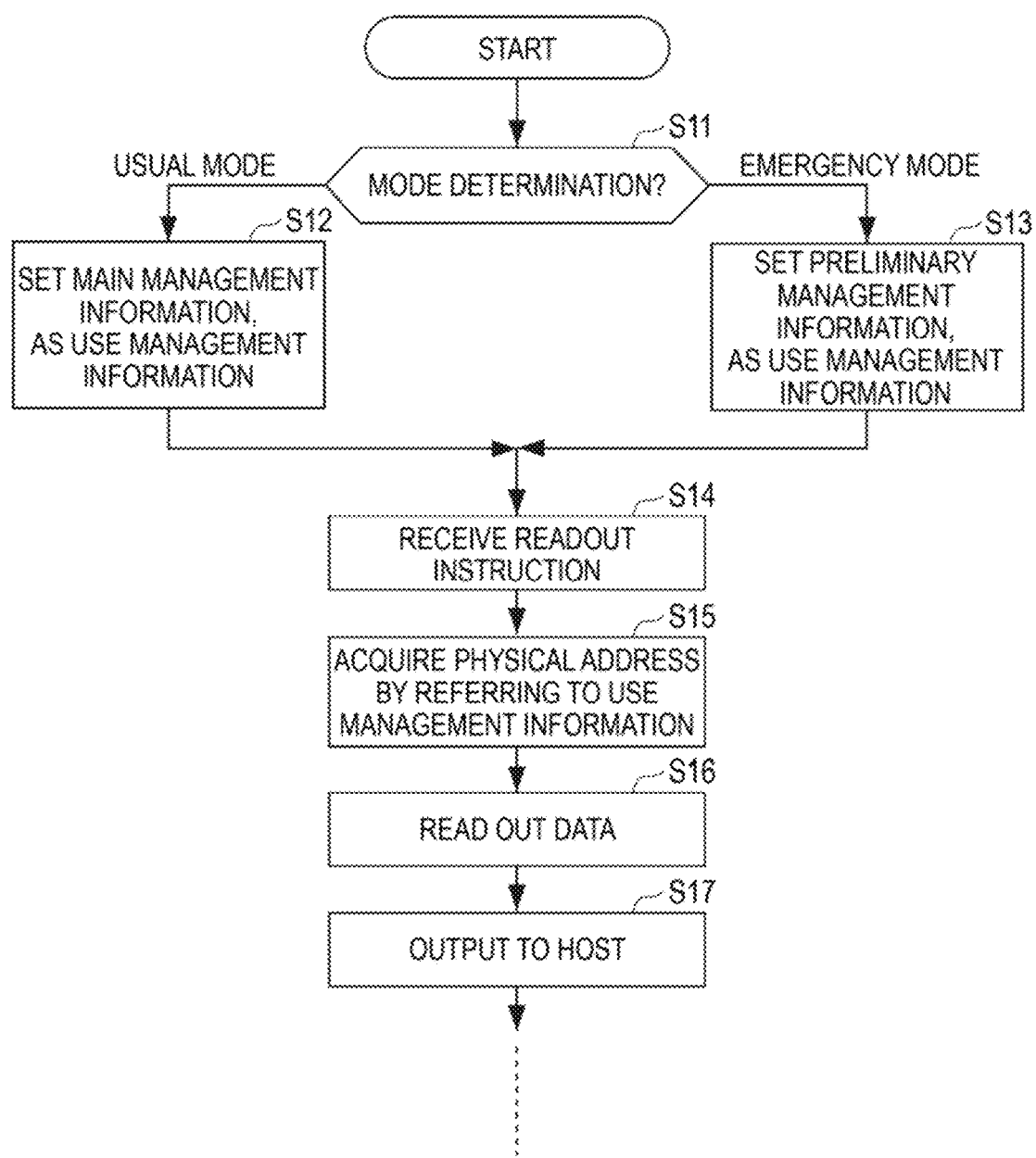
FIG. 4 is a flowchart depicting an operation example of the storage apparatus in accordance with the embodiment of the present disclosure.

The present embodiment is configured as described above and operates as follows. Upon start, the storage apparatus 1 of the present embodiment starts processing exemplified in FIG. 4 to determine whether to start the storage apparatus 1 in the mode (usual mode) where access to the flash memory unit 14 is performed using the main management information or in the mode (emergency mode) where access to the flash memory unit 14 is performed using the preliminary management information, based on the predetermined determination reference (S11: mode determination).

Specifically, in step S11, the storage apparatus 1 checks whether the GPIO of the interface unit 12 is electrically high (High), and when it is checked that the GPIO of the interface unit 12 is electrically high, the storage apparatus 1 determines to start in the mode (usual mode) where access to the flash memory unit 14 is performed using the main management information (S11: usual mode), and sets the main management information as the use management information (S12). When it is checked in step S11 that the GPIO of the interface unit 12 is not electrically high, the storage apparatus 1 determines to start in the mode (emergency mode) where access to the flash memory unit 14 is performed using the preliminary management information (S11: emergency mode), and sets the preliminary management information as the use management information (S13).

The storage apparatus 1 operates, in response to an instruction input from the host 2. When an instruction to read data is received from the host 2 via the interface unit 12 (S14), the storage apparatus 1 refers to the use management information selected in step S12 or S13 to acquire a physical address corresponding to a logical address designated in the readout instruction (S15). The storage apparatus 1 reads out data from a storage destination indicated by the acquired physical address (S16), and transmits the read data to the host 2 (S17).

Figure 5:
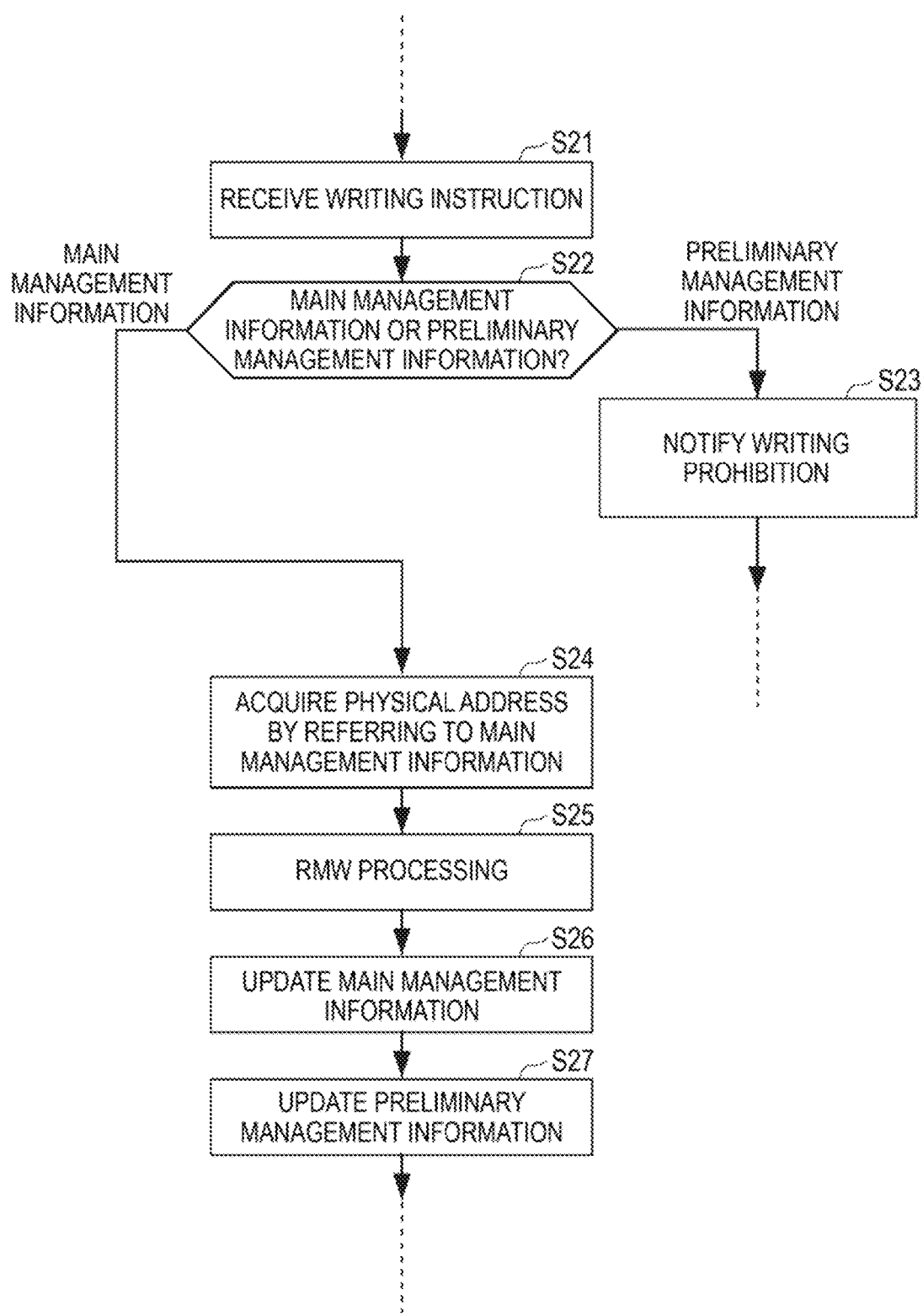
FIG. 5 is another flowchart depicting the operation example of the storage apparatus in accordance with the embodiment of the present disclosure.

As shown in FIG. 5, when a designation of a logical address indicative of a writing destination and an instruction to write data are received from the host 2 (S21: receive a writing instruction) after step S12 or S13, the storage apparatus 1 determines whether the use management information is set to the main management information or the preliminary management information (S22). That is, the storage apparatus 1 may check whether the mode selected in step S11 is the usual mode or the emergency mode.

When it is determined that the preliminary management information is set as the use management information (S22: preliminary management information), the storage apparatus 1 notifies an error, which indicates that a writing is prohibited, to the host 2 (S23), and continues the processing.

In this example, the host 2 receives the notification and presents an error, which indicates that data cannot be written, to a user who has issued the instruction to write data.

When it is determined in step S22 that the main management information is set as the use management information (S22: main management information), the storage apparatus 1 refers to the main management information set as the use management information, and acquires a physical address corresponding to the designated logical address (S24).

The storage apparatus 1 executes the RMW processing on data in a block (target block) specified by the acquired physical address (S25). That is, the storage apparatus 1 reads data in the target block into the cache. The storage apparatus 1 also specifies a physical address (new address) of a block that is an empty block. Then, the storage apparatus 1 overwrites a part, which is specified by the acquired physical address, of the stored data with instructed data, and writes the data (data of one block) whose at least a part is overwritten into a block specified with the new address. The storage apparatus 1 also sets the data in the target block as being invalid, and sets the target block as an empty block.

At this time, the storage apparatus 1 rewrites a physical address, which corresponds to the logical address received from the host 2, of the main management information that is the use management information to the new address (S26: update of main management information).

Thereafter, the storage apparatus 1 copies the main management information, and stores the same in the storage unit 13, as the preliminary management information (S27).

By the operations of the storage apparatus 1, the main management information updated by the processing of writing data and the like is separately written as the preliminary management information while the storage apparatus operates in the usual mode.

When it is not possible to read out the main management information, the user connects the GPIO of the interface unit 12 to a line that is electrically high and starts the storage apparatus 1. Here, the connection may be performed in a manner of inserting a jumper line or in a manner of connecting a circuit by using a dip switch.

The storage apparatus 1 checks whether the GPIO of the interface unit 12 is electrically high upon start, and when it is checked that the GPIO of the interface unit 12 is electrically high, the storage apparatus 1 operates in the emergency mode, and operates by using the preliminary management information as the use management information.

In this example of the present embodiment, data is read out by referring to the preliminary management information separately written. Therefore, even when the main management information is corrupted, data can be read out. While the preliminary management information is set as the use management information, writing is prohibited (read-only), so that even when the flash memory unit 14 has many bad sectors, for example, progress of further corruption can be delayed and the possibility of readout can be increased.

[Other Examples of Mode Switching]

In the above, the usual mode and the emergency mode are switched depending on whether the GPIO of the interface unit 12 is electrically high. However, the present embodiment is not limited thereto. For example, the storage apparatus 1 may start in the usual mode when the GPIO of the interface unit 12 is electrically low upon start or may start in the emergency mode when the GPIO is electrically high.

In addition, instead of using the GPIO, the usual mode and the emergency mode may be switched depending on whether a pair of predetermined signal lines of the controller 11 is short-circuited or opened. Here, the signal lines may be a command output signal line for outputting a command to a peripheral circuit, and a response input signal line for receiving an input of a response from the peripheral circuit. In this example, the controller 11 outputs a predetermined command via the command output signal line and checks an input from the response input signal line, upon start. Here, when the output predetermined command is input from the response input signal line, as it is, the controller 11 determines that the signal lines are short-circuited, and starts in the emergency mode. That is, the preliminary management information is set as the use management information. On the other hand, when the controller 11 outputs a predetermined command via the command output signal line upon start, if an input from the response input signal line is different from the predetermined command, the controller 11 determines that the signal lines are opened, and starts in the usual mode. That is, the main management information is set as the use management information.

In an example of the present embodiment, the storage apparatus 1 may switch the usual mode and the emergency mode, based on a connection state of pins of the interface unit 12, which is an external interface having a plurality of pins, upon start of the storage apparatus 1, and select one of the main management information and the preliminary management information as the use management information.

Specifically, the storage apparatus 1 switches the usual mode and the emergency mode, depending on a connection state of a power supply line or a signal line of the SATA that is the interface unit 12. As an example, the usual mode and the emergency mode may be switched depending on whether a 12V power supply line (which is not generally used in the SSD), which receives an input of 12V, of the power supply lines of the SATA provided to the storage apparatus 1 is at a GND level or is an open terminal (NC) upon start of the storage apparatus 1. In this example, the interface unit 12 may have a detection circuit configured to detect whether the 12V power supply line is at the GND level or is an open terminal. The storage apparatus 1 checks an output of the detection circuit upon start to recognize whether the 12V power supply line is at the GND level or is an open terminal, and starts in the emergency mode and sets the preliminary management information as the use management information when the 12V power supply line is at the GND level (a jumper line or the like is connected so that the 12V power supply line is short-circuited with a GND), for example.

In addition, upon start, when it is checked by the output of the detection circuit that the 12V power supply line is not at the GND level, such as a case where the 12V power supply line is opened (a jumper line or the like is not connected so that the 12V power supply line is short-circuited with a GND) and a case where a predetermined voltage (including a case of 12V) is applied, the storage apparatus 1 starts in the usual mode and sets the main management information as the use management information.

In the SATA, ports where a connector of the power supply line and a connector of the signal line are separate from each other are defined. Therefore, the storage apparatus 1 may switch the usual mode and the emergency mode, depending on whether the connector of the signal line is connected, upon start (the power supply line is connected and a power supply is turned on).

In this example, the user who wants to start the storage apparatus 1 in the emergency mode turns on the power supply of the host 2 to start the storage apparatus 1, in a state where the connector of the signal line of connectors of the interface unit 12 is disconnected. The storage apparatus 1 detects that the signal line is not connected, upon start, starts in the emergency mode and sets the preliminary management information as the use management information.

The user who wants to start the storage apparatus 1 in the usual mode turns on the power supply of the host 2 to start the storage apparatus 1, as usual, in a state where both the connector of the power supply line of the interface unit 12 and the connector of the signal line are connected to the host 2. The storage apparatus 1 detects that the signal line is connected, upon start, starts in the usual mode and sets the main management information as the use management information.

The storage apparatus 1 may also set any one of the usual mode and the emergency mode as a mode upon next start by a command (a mode switching command) input from the host 2.

In this example, the storage apparatus 1 has a non-volatile storage unit (register) that holds a content of the mode switching command input from the previous host 2 even when the power is not supplied.

When an input of the mode switching command is received from the host 2, the storage apparatus 1 holds a content of the mode switching command in the register. At this time, the storage apparatus 1 may perform restart. The storage apparatus 1 checks the content of the register upon next start such as after restart, and when it is checked that the register is empty (an input of the mode switching command is not received) or the mode switching command held in the register is an instruction to start in the "usual mode", the storage apparatus 1 starts in the usual mode and sets the main management information as the use management information.

On the other hand, when it is checked that the mode switching command held in the register is an instruction to start in the "emergency mode", upon start after restart, for example, the storage apparatus 1 starts in the emergency mode and sets the preliminary management information as the use management information.

In this example, when changing the mode of the storage apparatus 1, the user causes the host 2 to output a mode switching command to instruct start in a desired mode, in a state where the storage apparatus 1 is caused to operate with being connected to the host 2. The corresponding operation of the host 2 is preferably performed by driver software installed in the host 2, for example.

Also, in this example, when it is checked that the mode switching command is held in the register upon start, the storage apparatus 1 may start in a mode corresponding to the held mode switching command and return the content of the register to an empty state.

Effects of Embodiment

According to the present embodiment, even when the main management information that is usually used is corrupted, access to data can be performed using the preliminary management information. In addition, the user can explicitly instruct whether to start the storage apparatus 1 by using the main management information or the preliminary management information.

The present embodiment as described above can be summarized as follows.

An aspect of the present disclosure to solve the problems of the related art provides a storage apparatus that includes: a memory that stores data and main management information, the main management information identifying a physical address of the data; and processing circuitry configured to generate preliminary management information that includes information of the same content as the main management information, and select, as use management information, any one of the main management information and the preliminary management information upon start of the storage apparatus. Access to the data stored in the memory is performed using the selected use management information.

According to the storage apparatus, since the preliminary management information is generated, in addition to the main management information that is mainly used, even when the main management information is corrupted, access to data can be performed using the preliminary management information.

When the preliminary management information is selected as the use management information, the processing circuitry may perform only readout access by using the selected use management information, as the access to the data stored in the memory.

In this example, since data writing of all types using the preliminary management information, such as writing of data based on a command from the host and rewriting of data in a background, is not allowed, rewriting of the preliminary management information does not occur. Therefore, it is possible to prevent corruption of the preliminary management information.

In addition, the processing circuitry may be configured to determine whether a circuit is wired as predetermined upon start of the memory, and to select any one of the main management information and the preliminary management information as the use management information, based on a result of the determination.

According to the above example, the use of the main management information and the preliminary management information can be switched according to the wiring of the circuit.

The storage apparatus may also have an external interface having a plurality of signal lines. The processing circuitry may be configured to select any one of the main management information and the preliminary management information as the use management information, based on a state of wiring of the plurality of signal lines of the external interface.

According to the above example, the use of the main management information and the preliminary management information can be switched according to the state of wiring of the plurality of signal lines of the external interface.

The storage apparatus may also have an external interface having a plurality of pins. The processing circuitry may be configured to select any one of the main management information and the preliminary management information as the use management information, based on a connection state of the external interface upon start of the storage apparatus.

According to the above example, the use of the main management information and the preliminary management information can be switched according to the connection state of the external interface.

The processing circuitry may also be configured to receive a switching command, and when the switching command is received, the processing circuitry restarts the storage apparatus to select the preliminary management information as the use management information.

In this example, the use of the main management information and the preliminary management information can be switched by the switching command.

The storage apparatus may also further have a second memory different from the memory. The preliminary management information is stored in the second memory, and the main management information is stored in the memory.

According to this example, since the preliminary management information is stored in the second memory different from the memory in which the main management information is stored, the redundancy of the management information can be further improved.

According to the present disclosure, access to data can be performed even when the management information that is usually used is corrupted.

The invention claimed is:

1. A storage apparatus, comprising:
a memory that stores data and main management information, the main management information identifying a physical address of the data in a region of the memory; and
processing circuitry configured to
generate preliminary management information that includes information of the same content as the main management information, the preliminary management information identifying the physical address of the data in the region of the memory, and
select, as use management information, any one of the main management information and the preliminary management information upon start of the storage apparatus, wherein
access to the data stored in the memory is performed using the selected use management information, and
the preliminary management information includes the information of the same content as the main management information while the main management information is selected as the use management information and the data stored in the memory is accessed.

2. The storage apparatus according to claim 1, wherein the main management information includes a conversion table from a logical address to the physical address.

3. The storage apparatus according to claim 1, wherein when the preliminary management information is selected as the use management information, the processing circuitry performs only readout access by using the selected use management information, as the access to the data stored in the memory.

4. The storage apparatus according to claim 1, wherein when the preliminary management information is selected as the use management information, the processing circuitry outputs an error notification indicating that a writing is prohibited in response to receiving a writing instruction.

5. The storage apparatus according to claim 1, wherein the processing circuitry is configured to determine whether a circuit is wired as predetermined upon start of the memory, and to select any one of the main management information and the preliminary management information as the use management information, based on a result of the determination.

6. A storage apparatus, comprising:
a memory that stores data and main management information, the main management information identifying a physical address of the data; and
processing circuitry configured to
generate preliminary management information that includes information of the same content as the main management information, and
select, as use management information, any one of the main management information and the preliminary management information upon start of the storage apparatus, wherein
access to the data stored in the memory is performed using the selected use management information,
the processing circuitry is configured to determine whether a circuit is wired as predetermined upon start of the memory, and to select any one of the main management information and the preliminary management information as the use management information, based on a result of the determination, and
the processing circuitry is configured to select the preliminary management information as the use management information in response to determining that the circuit is not wired as predetermined.

7. The storage apparatus according to claim 1, further comprising an external interface having a plurality of signal lines, wherein
the processing circuitry is configured to select any one of the main management information and the preliminary management information as the use management information, based on a state of wiring of the plurality of signal lines of the external interface.

8. The storage apparatus according to claim 7, wherein the processing circuitry is configured to select the preliminary management information as the use management information in response to determining that a predetermined signal line of the plurality of the signal lines is electrically high.

9. The storage apparatus according to claim 8, wherein the predetermined signal line is a General Purpose I/O (GPIO).

10. The storage apparatus according to claim 1, further comprising an external interface having a plurality of pins, wherein
the processing circuitry is configured to select any one of the main management information and the preliminary management information as the use management information, based on a connection state of the external interface upon start of the storage apparatus.

11. The storage apparatus according to claim 1, wherein
the processing circuitry is configured to receive a switching command, and
when the switching command is received, the processing circuitry restarts the storage apparatus to select the preliminary management information as the use management information.

12. The storage apparatus according to claim 1, wherein the processing circuitry is configured to generate or update the preliminary management information when the main management information is updated.

13. The storage apparatus according to claim 1, wherein the processing circuitry is configured to generate or update the preliminary management information each time a predetermined time elapses.

14. The storage apparatus according to claim 1, wherein the processing circuitry is configured to generate or update the preliminary management information each time the main management information is updated by a predetermined number of times.

15. The storage apparatus according to claim 1, further comprising a second memory different from the memory, wherein
the preliminary management information is stored in the second memory, and the main management information is stored in the memory.

16. The storage apparatus according to claim 1, wherein the storage apparatus is a Solid State Drive (SSD) where a storage area is divided into a plurality of blocks and each block is further divided into pages and managed.

17. A method that is executed by a storage apparatus, comprising:
storing, in a memory of the storage apparatus, data and main management information, the main management information identifying a physical address of the data in a region of the memory;
generating, using processing circuitry of the storage apparatus, preliminary management information that includes information of the some content as the main management information, the preliminary management information identifying the physical address of the data in the region of the memory; and
selecting, as use management information, using the processing circuitry, any one of the main management information and the preliminary management information upon start of the storage apparatus, wherein
access to the data stored in the memory is performed using the selected use management information, and
the preliminary management information includes the information of the same content ad the main management information while the main management information is selected as the use management information and the data stored in the memory is accessed.

* * * * *